United States Patent [19]

Ogata

[11] Patent Number: 5,166,828
[45] Date of Patent: Nov. 24, 1992

[54] ZOOM LENS SYSTEM

[75] Inventor: Yasuzi Ogata, Tokyo, Japan

[73] Assignee: Olympus Optical Co., Ltd., Tokyo, Japan

[21] Appl. No.: 709,163

[22] Filed: Jun. 3, 1991

[30] Foreign Application Priority Data

Jun. 4, 1990 [JP] Japan .................................. 2-144377

[51] Int. Cl.⁵ ............................................. G02B 15/14
[52] U.S. Cl. ..................................................... 359/689
[58] Field of Search ................ 359/676, 683, 689, 703

[56] References Cited

U.S. PATENT DOCUMENTS 4,773,774  9/1988  Yamanashi .......................... 359/689

FOREIGN PATENT DOCUMENTS

| 63-43115 | 2/1988 | Japan . |
| 63-153511 | 6/1988 | Japan . |
| 64-72114 | 3/1989 | Japan . |
| 1-230013 | 9/1989 | Japan . |
| 1-252915 | 10/1989 | Japan . |
| 2-16515 | 1/1990 | Japan . |
| 2-37317 | 2/1990 | Japan . |
| 2-50118 | 2/1990 | Japan . |
| 2-63007 | 3/1990 | Japan . |
| 2-73211 | 3/1990 | Japan . |

Primary Examiner—Scott J. Sugarman
Attorney, Agent, or Firm—Cushman, Darby & Cushman

[57] ABSTRACT

A zoom lens system has (in order from the object side of the lens system) a first lens unit with a positive refractive power, a second lens unit with a positive refractive power, and a third lens unit with a negative refractive power. The second lens unit has (in order from the object side of the lens system) an aperture stop, a negative lens element, a positive lens element, and a cemented doublet. Airspaces are disposed between the first and second lens units, between the third lens element and the cemented doublet, and between the second and third lens units. The lens system performs a zoom operation when the lens units are moved toward the object side so that the airspace between the first and second lens units is widened while the airspace between the second and third lens units is narrowed.

6 Claims, 15 Drawing Sheets

ZOOM LENS SYSTEM

BACKGROUND OF THE INVENTION a) Field of the invention

The present invention relates to a zoom lens system for lens shutter cameras, and more specifically to a zoom lens system which has high vari-focal ratio, and is nevertheless compact in external design, high in optical performance and manufacturable at a low cost.

b) Description of the prior art

The zoom lens system according to the present invention has a high vari-focal ratio within a range of focal length from 38 mm to 105 mm. As conventional examples of the zoom lens systems having vari-focal ratios on the similar order, there are known the zoom lens systems listed below:

(1) The zoom lens systems each consisting of a first positive lens unit and a second negative lens unit as exemplified by the lens system disclosed by Japanese Patent Kokai Publication No. Hei 2-50118.

(2) The zoom lens systems each consisting of a first positive lens unit, a second positive lens unit and a third negative lens unit as exemplified by the lens systems disclosed by Japanese Patents Kokai Publication No. Sho 63-153511, Kokai Publication No. Hei 2-16515 and Kokai Publication No. Hei 2-73211.

(3) The zoom lens systems each consisting of a first negative lens unit, a second positive lens unit and a third negative lens unit as exemplified by the lens systems disclosed by Japanese Patent Kokai Publication No. Sho 64-72114, Kokai Publication No. Hei 2-37317 and Kokai Publication No. Hei 2-63007.

(4) The zoom lens systems each consisting of a first positive lens unit, a second negative lens unit, a third positive lens unit and a fourth negative lens unit as exemplified by the lens systems disclosed by Japanese Patents Kokai Publication No. Sho 63-43115 and Kokai Publication No. Hei 1-252915.

Out of the conventional zoom lens systems mentioned above, the type (1) has a simple composition but, when its vari-focal ratio is enhanced, both the lens units are moved for long distances, thereby enlarging external design of the zoom lens system.

Further, the type (4) comprises a large number of lens units. Accordingly, this type of zoom lens system requires a complicated mechanism for moving the lens units and arrangement of the lens units with very little eccentricity, thereby having a disadvantage from the viewpoint of manufacturing.

Furthermore, the type (2) or (3) which consists of the three lens units can be designed as a compact zoom lens system. However, the type (3) which comprises the negative lens unit on the most object side is not suited for a compact design since the moving distance for the lens units are largely different from one another and the mechanism for moving the lens units can hardly be simplified in this zoom lens system. In contrast, the type (2) which comprises the positive lens unit on the most object side allows the first lens unit and the third lens unit to be moved integrally, and the moving mechanism to be simplified since the moving distance for the first lens unit is little different from that for the third lens unit.

Out of the conventional zoom lens systems described above, the lens systems disclosed by Japanese Patents Kokai Publication No. Sho 63-153511, Kokai Publication No. Hei 1-230013 and Kokai Publication No. Hei 2-73211 have long total lengths and are not compact in external designs.

In addition, the zoom lens system proposed by Japanese Patent Kokai Publication No. Hei 2-16515 has a short total length, but aberrations therein are not corrected sufficiently for practical use of this zoom lens system.

SUMMARY OF THE INVENTION

A primary object of the present invention is to provide an improvement of the zoom lens system of the above-mentioned type (2) which consists of the three lens units, or to provide a zoom lens system which has a high vari-focal ratio, and is nevertheless compact in external design, high in optical performance and manufacturable at a low cost.

The zoom lens system according to the present invention comprises, in the order from the object side, a first lens unit having a positive refractive power, a second lens unit having a positive refractive power and a third lens unit having a negative refractive power; and adapted so as to perform variation of focal length from the wide position to the tele position by moving the lens units so that the airspace reserved between the first lens unit and the second lens units is widened, and the airspace reserved between the second lens unit and the third lens unit is narrowed; said second lens unit comprising, in the order from the object side, a negative lens element, a positive lens element, a positive lens element, and a cemented doublet consisting of a negative lens element and a positive lens element. Further, the second lens element comprises an air lens having a diverging function and at least one aspherical surface, and is designed so as to satisfy the following conditions (1) through (4):

(1) $0.1 < |(r_A - r_B)/(r_A + r_B)| < 1.0$
(2) $0.5 < r_C/f_2 < 5.0$
(3) $1.55 < n_{2p} < 1.75$
(4) $1.65 < n_{2n}$ wherein the reference symbols $r_A$ and $r_B$ represent radii of curvature on the object side surface and the image side surface respectively of said air lens, the reference symbol $r_C$ designates the radius of curvature on the cemented surface in said cemented doublet, the reference symbol $f_2$ denotes the focal length of the second lens unit, the reference symbol $n_{2p}$ represents the mean value of the refractive indices of the positive lens elements arranged in the second lens unit and the reference symbol $n_{2n}$ designates the mean value of the refractive indices of the negative lens elements arranged in the second lens unit.

In addition, the two lens elements arranged on the object side in the second lens unit may be cemented to each other.

As means for designing a lens system so as to be compact, or especially so as to have a short total length, it is conceivable to design each lens unit and each airspace as thin as possible, to reduce number of lens elements and/or to shorten moving distances of lens units.

The present invention has succeeded in designing the zoom lens system compact by thinning each of the lens elements and each of the airspaces, and reducing number of lens elements to be used for composing the lens system.

In the zoom lens system according to the present invention, an aperture stop is arranged at the most object side location in the second lens unit so as to allow the diameters of the lens elements arranged in the first lens unit to be reduced, thereby making it possible to thin each of the lens elements while reserving required thickness at the marginal portions thereof. Further, the reduction of the diameters of the lens elements produces an effect to reduce manufacturing costs of the lens elements. Furthermore, when the first lens unit is composed of a negative lens element and a positive lens element as in some of the embodiments of the present invention to be described later, the diameter of the first lens unit and manufacturing cost thereof can be further reduced.

In the next place, the second lens unit is designed so as to have a length as short as possible as measured on the optical axis. Though aberrations are varied remarkably by varying focal length of the zoom lens system in this case, aberrations in the zoom lens system according to the present invention are corrected favorably by selecting the above-described composition for the second lens unit. Speaking concretely, the variations of spherical aberration and coma are corrected by using the air lens having the diverging function in the second lens unit. The condition (1) has been adopted for this purpose.

If the lower limit of the condition (1) is exceeded, the air lens will have a power which is too weak for sufficiently correcting the aberrations. If the upper limit of the condition (1) is exceeded, the air lens will have too strong a power, thereby making it impossible to correct the aberrations with good balance by the other surfaces or even by using aspherical surfaces.

Further, the lateral chromatic aberration varies remarkably in the second lens unit, and it is effective for correcting this aberration to arrange the cemented doublet at the most image side location in the lens unit at which the offaxial ray is the highest. The condition (2) defines the radius of curvature on the cemented surface of this cemented doublet.

If the upper limit of the condition (2) is exceeded, the cemented surface will have an insufficient correcting function, thereby allowing the lateral chromatic aberration to be varied remarkably. If the lower limit of the condition (2) is exceeded, in contrast, the lateral chromatic aberration will be varied remarkably by varying field angle in the vicinity of the wide position, thereby making the zoom lens system unsuited for practical use.

Furthermore, as the length of the second lens unit as measured on the optical axis is shortened, Petzval's sum is curved toward the positive side and curvature of field is apt to be overcorrected especially at the wide position. In order to obtain an adequate Petzval's sum, the conditions (3) and (4) have been adopted.

If the upper limit of the condition (3) is exceeded, it will be impossible to correct the Petzval's sum. If the lower limit of the condition (3) is exceeded, each of the lens elements will have too high curvature, thereby undesirably allowing the lateral chromatic aberration to be aggravated.

If the lower limit of the condition (4) is exceeded, it will be impossible to correct the Petzval's sum sufficiently favorably.

By designing the zoom lens system according to the present invention as described above, it can be compact in external design, manufactured at a low cost and excellent in optical performance.

However, in order to reduce further enhance the optical performance of the zoom lens system according to the present invention by reducing variation of the longitudinal chromatic aberration, it is desirable to design, as a cemented doublet, the negative lens element and the positive lens element which are arranged right after the aperture stop in the second lens unit. In this case, it is desirable that the first cemented doublet which is arranged right after the aperture stop and the second cemented doublet which is used in the second lens unit as already described are designed so as to have focal lengths satisfying the conditions (5) and (6) listed below:

(5) $|f_{C1}/f_T| > 2$ (6) $|f_{C2}/f_T| > 2$ wherein the reference symbol $f_T$ represents the focal length of the zoom lens system as a whole at the tele position, the reference symbol $f_{C1}$ designates the focal length of the first cemented doublet and the reference symbol $f_{C2}$ denotes the focal length of the second cemented doublet.

As is judged from these conditions (5) and (6), freedom for correcting the chromatic aberration is desirably enhanced by weakening the power of the cemented doublets. The condition (5) is adopted mainly for correcting the longitudinal chromatic aberration, whereas the condition (6) is selected mainly for correcting the lateral chromatic aberration. If the lower limit of the condition (5) is exceeded, it will be impossible to correct the longitudinal chromatic aberration sufficiently favorably. If the lower limit of the condition (6) is exceeded, it will be impossible to correct the lateral chromatic aberration sufficiently favorably.

Moreover, aberrations of the g-line in the second lens unit are corrected with the air lens and the aspherical surface. It is desirable that this aspherical surface has a shape which has a positive power weakened at the portions thereof farther from the optical axis.

DETAILED DESCRIPTION OF THE PREFERRED EMBODIMENTS

Figure 1:
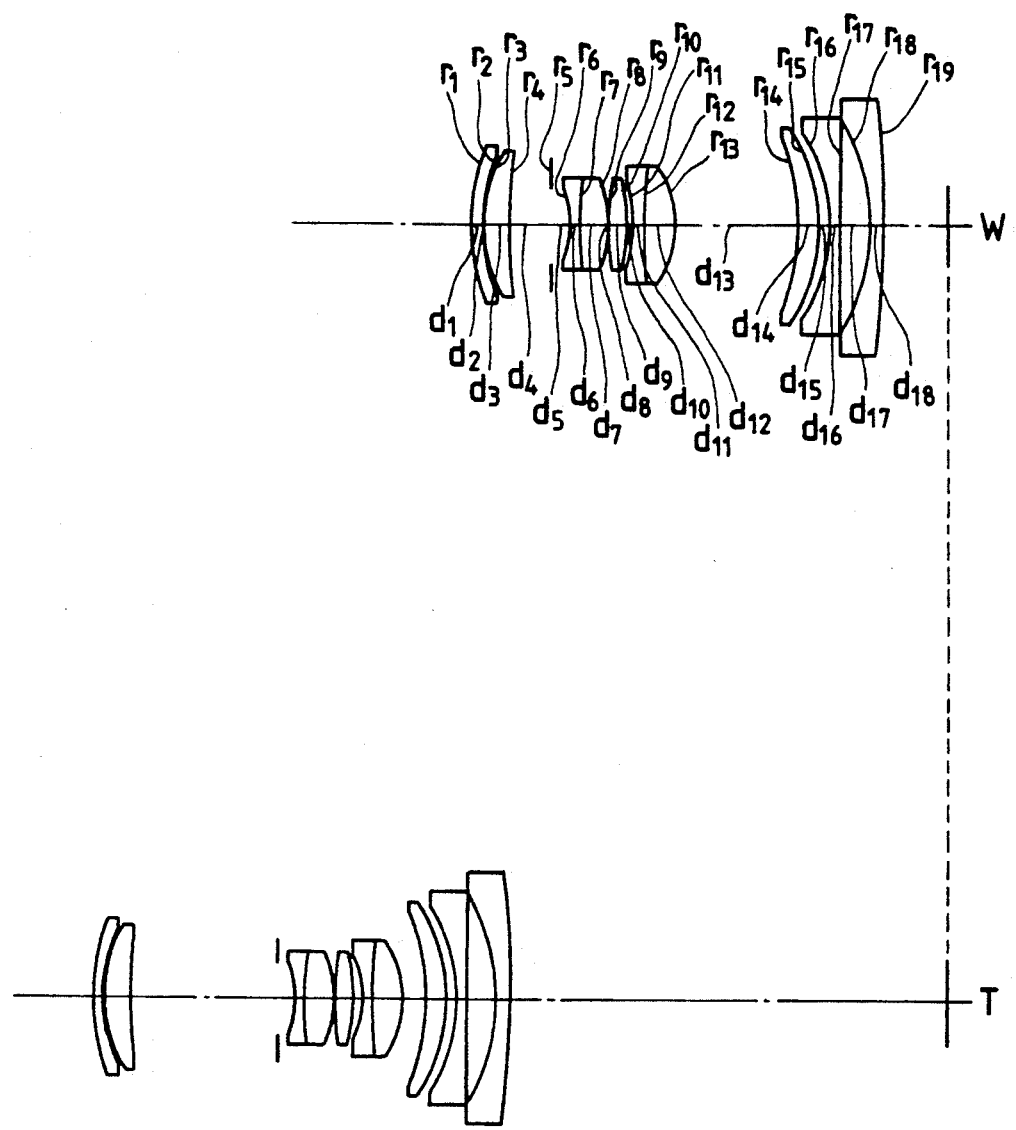
FIG. 1 through FIG. 6 show sectional views illustrating compositions of Embodiments 1 through 6 of the zoom lens system according to the present invention.

Now, the present invention will be described more detailedly below with reference to the preferred embodiments illustrated in the accompanying drawings and given in the form of the following numerical data:

Embodiment 1

$f = 39.33 \sim 63.13 \sim 101.33$
$F_{NO} = 3.9 \sim 5.5 \sim 8.1$
$f_B = 7.25 \sim 24.38 \sim 51.02$
$2\omega = 57.6° \sim 37.8° \sim 24.1°$ $r_1 = 24.1370$
$d_1 = 1.2000 \quad n_1 = 1.80518 \quad \nu_1 = 25.43$
$r_2 = 18.4930$
$d_2 = 0.3000$
$r_3 = 16.6280$
$d_3 = 3.1300 \quad n_2 = 1.48749 \quad \nu_2 = 70.20$
$r_4 = 76.8310$
$d_4 = D_1$ (variable)
$r_5 = \infty$ (stop)
$d_5 = 2.1000$
$r_6 = -12.5400$
$d_6 = 1.2000 \quad n_3 = 1.77250 \quad \nu_3 = 49.66$
$r_7 = 60.2070$
$d_7 = 3.4200 \quad n_4 = 1.76182 \quad \nu_4 = 26.55$
$r_8 = -14.1760$
$d_8 = 0.1500$
$r_9 = 82.0680$
$d_9 = 2.2000 \quad n_5 = 1.51823 \quad \nu_5 = 58.96$
$r_{10} = -17.8330$ (aspherical surface)
$d_{10} = 0.8000$
$r_{11} = -11.9510$
$d_{11} = 1.2000 \quad n_6 = 1.80518 \quad \nu_6 = 25.43$
$r_{12} = 91.7600$
$d_{12} = 3.7500 \quad n_7 = 1.69680 \quad \nu_7 = 55.52$
$r_{13} = -12.5080$
$d_{13} = D_2$ (variable)
$r_{14} = -31.5770$
$d_{14} = 2.7400 \quad n_8 = 1.84666 \quad \nu_8 = 23.78$
$r_{15} = -19.2900$
$d_{15} = 0.9800$
$r_{16} = -21.1910$
$d_{16} = 1.5400 \quad n_9 = 1.77250 \quad \nu_9 = 49.66$
$r_{17} = -211.6450$
$d_{17} = 3.1500$
$r_{18} = -24.3220$
$d_{18} = 1.8500 \quad n_{10} = 1.69680 \quad \nu_{10} = 55.52$
$r_{19} = -112.4410$

| f | 39.33 | 63.13 | 101.33 |
|---|---|---|---|
| $D_1$ | 4.933 | 11.853 | 16.913 |
| $D_2$ | 14.358 | 7.437 | 2.377 | aspherical surface coefficient
$A_4 = 0.53413 \times 10^{-4}, A_6 = 0.14744 \times 10^{-6}$
$A_8 = 0.43055 \times 10^{-8}, A_{10} = 0$
$|(r_A - r_B)/(r_A + r_B)| = 0.20, r_C/f_2 = 2.99$
$\overline{n_{2p}} = 1.66, \overline{n_{2n}} = 1.79, |f_{C1}/f_T| = 15.4$
$|f_{C2}/f_T| = 5.0$

Embodiment 2

$f = 39.33 \sim 63.13 \sim 101.33$
$F_{NO} = 3.9 \sim 5.6 \sim 8.1$
$f_B = 8.99 \sim 27.16 \sim 55.31$
$2\omega = 57.6° \sim 37.8° \sim 24.1°$ $r_1 = \infty$
$d_1 = 1.2000 \quad n_1 = 1.83400 \quad \nu_1 = 37.16$
$r_2 = 37.7880$
$d_2 = 1.8700 \quad n_2 = 1.56883 \quad \nu_2 = 56.34$
$r_3 = 229.2150$
$d_3 = 0.2000$
$r_4 = 24.7980$
$d_4 = 2.5900 \quad n_3 = 1.58913 \quad \nu_3 = 60.97$
$r_5 = 714.8760$
$d_5 = D_1$ (variable)
$r_6 = \infty$ (stop)
$d_6 = 2.2000$
$r_7 = -14.8420$
$d_7 = 0.9000 \quad n_4 = 1.72916 \quad \nu_4 = 54.68$
$r_8 = -132.8210$
$d_8 = 1.9000$
$r_9 = 225.1110$
$d_9 = 3.3700 \quad n_5 = 1.78472 \quad \nu_5 = 25.68$
$r_{10} = -18.0500$
$d_{10} = 1.2300$
$r_{11} = \infty$
$d_{11} = 2.2200 \quad n_6 = 1.58913 \quad \nu_6 = 60.97$
$r_{12} = -22.8510$ (aspherical surface)
$d_{12} = 1.0000$
$r_{13} = -14.3350$
$d_{13} = 1.2000 \quad n_7 = 1.80518 \quad \nu_7 = 25.43$
$r_{14} = 45.8470$
$d_{14} = 5.2500 \quad n_8 = 1.69680 \quad \nu_8 = 55.52$
$r_{15} = -14.9960$
$d_{15} = D_2$ (variable)
$r_{16} = -44.5590$
$d_{16} = 2.6300 \quad n_9 = 1.84666 \quad \nu_9 = 23.78$
$r_{17} = -24.8240$
$d_{17} = 0.1500$
$r_{18} = -29.1000$
$d_{18} = 1.5400 \quad n_{10} = 1.69680 \quad \nu_{10} = 55.52$
$r_{19} = 828.9250$
$d_{19} = 2.9500$
$r_{20} = -32.7910$
$d_{20} = 1.8500 \quad n_{11} = 1.69680 \quad \nu_{11} = 55.52$
$r_{21} = 179.3300$

| f | 39.33 | 63.13 | 101.33 |
|---|---|---|---|
| $D_1$ | 4.549 | 11.860 | 17.239 |
| $D_2$ | 13.701 | 6.390 | 1.010 | aspherical surface coefficient
$A_4 = 0.44262 \times 10^{-4}, A_6 = 0.40304 \times 10^{-8}$
$A_8 = 0.23743 \times 10^{-8}, A_{10} = 0$
$|(r_A - r_B)/(r_A + r_B)| = 0.23, r_C/f_2 = 1.47$
$\overline{n_{2p}} = 1.69, \overline{n_{2p}} = 1.77$

Embodiment 3

$f = 39.33 \sim 63.13 \sim 101.33$
$F_{NO} = 3.6 \sim 5.4 \sim 8.1$
$f_B = 7.48 \sim 26.15 \sim 55.70$
$2\omega = 57.6° \sim 37.8° \sim 24.1°$ $r_1 = 19.8160$
$d_1 = 1.1000 \quad n_1 = 1.83400 \quad \nu_1 = 37.16$
$r_2 = 16.0080$
$d_2 = 0.5000$
$r_3 = 14.1610$
$d_3 = 2.5600 \quad n_2 = 1.48749 \quad \nu_2 = 70.20$
$r_4 = 30.3870$
$d_4 = D_1$ (variable)
$r_5 = \infty$ (stop)
$d_5 = 2.0000$
$r_6 = -15.3450$
$d_6 = 0.8600 \quad n_3 = 1.65160 \quad \nu_3 = 58.52$
$r_7 = -78.0190$
$d_7 = 0.1500$
$r_8 = 15.5130$
$d_8 = 3.2500 \quad n_4 = 1.67270 \quad \nu_4 = 32.10$
$r_9 = 16.0200$
$d_9 = 1.0500$
$r_{10} = 103.1350$
$d_{10} = 1.8900 \quad n_5 = 1.60311 \quad \nu_5 = 60.70$
$r_{11} = -41.5780$ (aspherical surface)
$d_{11} = 0.2000$
$r_{12} = 50.5630$
$d_{12} = 1.0000 \quad n_6 = 1.75520 \quad \nu_6 = 27.51$
$r_{13} = 20.0150$
$d_{13} = 4.1700 \quad n_7 = 1.65160 \quad \nu_7 = 58.52$
$r_{14} = -20.6410$
$d_{14} = D_2$ (variable)
$r_{15} = -22.5610$
$d_{15} = 2.3700 \quad n_8 = 1.84666 \quad \nu_8 = 23.78$
$r_{16} = -17.2460$
$d_{16} = 0.1500$
$r_{17} = -21.6150$ -continued

| | | |
|---|---|---|
| $d_{17} = 1.5100$ | $n_9 = 1.65160$ | $\nu_9 = 58.52$ |
| $r_{18} = -540.9230$ | | |
| $d_{18} = 2.4400$ | | |
| $r_{19} = -33.4310$ | | |
| $d_{19} = 1.7600$ | $n_{10} = 1.65160$ | $\nu_{10} = 58.52$ |
| $r_{20} = 676.2660$ | | |

| f | 39.33 | 63.13 | 101.33 |
|---|---|---|---|
| $D_1$ | 4.779 | 11.335 | 15.876 |
| $D_2$ | 13.561 | 7.005 | 2.464 | aspherical surface coefficient
$A_4 = 0.54771 \times 10^{-4}$, $A_6 = 0.10616 \times 10^{-6}$
$A_8 = 0.15501 \times 10^{-7}$, $A_{10} = -0.18456 \times 10^{-9}$
$|(r_A - r_B)/(r_A + r_B)| = 0.73$, $r_C/f_2 = 0.68$
$\overline{n_{2p}} = 1.64$, $\overline{n_{2n}} = 1.70$

Embodiment 4
$f = 39.33 \sim 63.13 \sim 101.33$
$F_{NO} = 3.7 \sim 5.4 \sim 8.1$
$f_B = 7.22 \sim 23.11 \sim 48.05$
$2\omega = 57.6° \sim 37.8° \sim 24.1°$

| | | |
|---|---|---|
| $r_1 = 18.1920$ | | |
| $d_1 = 1.2000$ | $n_1 = 1.80518$ | $\nu_1 = 25.43$ |
| $r_2 = 14.1220$ | | |
| $d_2 = 0.3000$ | | |
| $r_3 = 13.4960$ | | |
| $d_3 = 3.1100$ | $n_2 = 1.48749$ | $\nu_2 = 70.20$ |
| $r_4 = 43.1720$ | | |
| $d_4 = D_1$ (variable) | | |
| $r_5 = \infty$ (stop) | | |
| $d_5 = 2.1000$ | | |
| $r_6 = -13.1260$ | | |
| $d_6 = 1.2000$ | $n_3 = 1.77250$ | $\nu_3 = 49.66$ |
| $r_7 = 25.3370$ | | |
| $d_7 = 3.4000$ | $n_4 = 1.72825$ | $\nu_4 = 28.46$ |
| $r_8 = -14.0370$ | | |
| $d_8 = 0.1500$ | | |
| $r_9 = 50.6430$ | | |
| $d_9 = 2.7700$ | $n_5 = 1.51633$ | $\nu_5 = 64.15$ |
| $r_{10} = -18.8660$ (aspherical surface) | | |
| $d_{10} = 1.0000$ | | |
| $r_{11} = -12.4880$ | | |
| $d_{11} = 1.2000$ | $n_6 = 1.80518$ | $\nu_6 = 25.43$ |
| $r_{12} = 68.2150$ | | |
| $d_{12} = 4.9300$ | $n_7 = 1.69680$ | $\nu_7 = 55.52$ |
| $r_{13} = -12.5510$ | | |
| $d_{13} = D_2$ (variable) | | |
| $r_{14} = -34.5910$ | | |
| $d_{14} = 3.2100$ | $n_8 = 1.84666$ | $\nu_8 = 23.78$ |
| $r_{15} = -18.2860$ | | |
| $d_{15} = 0.5000$ | | |
| $r_{16} = -19.8540$ | | |
| $d_{16} = 1.5400$ | $n_9 = 1.77250$ | $\nu_9 = 49.66$ |
| $r_{17} = 1393.6730$ | | |
| $d_{17} = 3.7000$ | | |
| $r_{18} = -22.0770$ | | |
| $d_{18} = 1.8500$ | $n_{10} = 1.77250$ | $\nu_{10} = 49.66$ |
| $r_{19} = -93.8990$ | | |

| f | 39.33 | 63.13 | 101.33 |
|---|---|---|---|
| $D_1$ | 4.977 | 10.500 | 14.438 |
| $D_2$ | 11.863 | 6.340 | 2.402 | aspherical surface coefficient
$A_4 = 0.74033 \times 10^{-4}$, $A_6 = 0.22319 \times 10^{-6}$
$A_8 = 0.81507 \times 10^{-8}$, $A_{10} = 0$
$|(r_A - r_B)/(r_A + r_B)| = 0.20$, $r_C/f_2 = 2.51$
$\overline{n_{2p}} = 1.65$, $\overline{n_{2n}} = 1.79$, $|f_{C1}/f_T| = 18.7$
$|f_{C2}/f_T| = 4.1$

Embodiment 5
$f = 39.33 \sim 63.13 \sim 101.33$
$F_{NO} = 3.7 \sim 5.4 \sim 8.1$
$f_B = 7.84 \sim 24.94 \sim 51.86$
$2\omega = 57.6° \sim 37.8° \sim 24.1°$

| | | |
|---|---|---|
| $r_1 = 24.5190$ | | |
| $d_1 = 1.0800$ | $n_1 = 1.80518$ | $\nu_1 = 25.43$ |
| $r_2 = 20.5070$ | | |
| $d_2 = 0.5000$ | | |
| $r_3 = 15.8160$ | | |
| $d_3 = 3.2100$ | $n_2 = 1.48749$ | $\nu_2 = 70.20$ |
| $r_4 = 37.1230$ | | |
| $d_4 = D_1$ (variable) | | |
| $r_5 = \infty$ (stop) | | |
| $d_5 = 1.6500$ | | |
| $r_6 = -16.4400$ | | |
| $d_6 = 0.8800$ | $n_3 = 1.69680$ | $\nu_3 = 55.52$ |
| $r_7 = 347.1250$ | | |
| $d_7 = 0.2000$ | | |
| $r_8 = 15.2960$ | | |
| $d_8 = 3.7600$ | $n_4 = 1.58362$ | $\nu_4 = 30.37$ |
| $r_9 = 17.7350$ | | |
| $d_9 = 1.2000$ | | |
| $r_{10} = 60.1990$ | | |
| $d_{10} = 1.6900$ | $n_5 = 1.57250$ | $\nu_5 = 57.76$ |
| $r_{11} = -44.9410$ (aspherical surface) | | |
| $d_{11} = 0.2000$ | | |
| $r_{12} = 37.3930$ | | |
| $d_{12} = 1.0000$ | $n_6 = 1.76182$ | $\nu_6 = 26.55$ |
| $r_{13} = 19.2150$ | | |
| $d_{13} = 4.0100$ | $n_7 = 1.65160$ | $\nu_7 = 58.52$ |
| $r_{14} = -21.6970$ | | |
| $d_{14} = D_2$ (variable) | | |
| $r_{15} = -24.6800$ | | |
| $d_{15} = 2.2900$ | $n_8 = 1.84666$ | $\nu_8 = 23.78$ |
| $r_{16} = -18.0500$ | | |
| $d_{16} = 0.2000$ | | |
| $r_{17} = -20.9900$ | | |
| $d_{17} = 1.5100$ | $n_9 = 1.69680$ | $\nu_9 = 55.52$ |
| $r_{18} = -376.7590$ | | |
| $d_{18} = 2.3000$ | | |
| $r_{19} = -31.7300$ | | |
| $d_{19} = 1.7600$ | $n_{10} = 1.65160$ | $\nu_{10} = 58.52$ |
| $r_{20} = 361.5420$ | | |

| f | 39.33 | 63.13 | 101.33 |
|---|---|---|---|
| $D_1$ | 5.561 | 11.525 | 15.737 |
| $D_2$ | 12.595 | 6.632 | 2.419 | aspherical surface coefficient
$A_4 = 0.66366 \times 10^{-4}$, $A_6 = 0.42721 \times 10^{-8}$
$A_8 = 0.11864 \times 10^{-7}$, $A_{10} = -0.74229 \times 10^{-10}$
$|(r_A - r_B)/(r_A + r_B)| = 0.54$, $r_C/f_2 = 0.68$
$\overline{n_{2p}} = 1.60$, $\overline{n_{2n}} = 1.73$

Embodiment 6
$f = 39.33 \sim 63.13 \sim 101.33$
$F_{NO} = 3.8 \sim 5.5 \sim 8.1$
$f_B = 8.75 \sim 26.81 \sim 55.02$
$2\omega = 57.6° \sim 37.8° \sim 24.1°$

| | | |
|---|---|---|
| $r_1 = 98.8770$ | | |
| $d_1 = 1.2000$ | $n_1 = 1.80518$ | $\nu_1 = 25.43$ |
| $r_2 = 52.0690$ | | |
| $d_2 = 0.1500$ | | |
| $r_3 = 22.6390$ | | |
| $d_3 = 2.6900$ | $n_2 = 1.48749$ | $\nu_2 = 70.20$ |
| $r_4 = 653.1800$ | | |
| $d_4 = D_1$ (variable) | | |
| $r_5 = \infty$ (stop) | | |
| $d_5 = 2.1000$ | | |
| $r_6 = -12.5450$ | | |
| $d_6 = 1.2000$ | $n_3 = 1.77250$ | $\nu_3 = 49.66$ |
| $r_7 = 67.8870$ | | |
| $d_7 = 3.6300$ | $n_4 = 1.76182$ | $\nu_4 = 26.55$ |
| $r_8 = -14.6420$ | | |
| $d_8 = 0.6000$ | | |
| $r_9 = 86.5730$ | | |
| $d_9 = 2.2700$ | $n_5 = 1.55963$ | $\nu_5 = 61.17$ |
| $r_{10} = -18.1710$ (aspherical surface) | | |
| $d_{10} = 0.8000$ | | |
| $r_{11} = -12.9880$ | | |
| $d_{11} = 1.2000$ | $n_6 = 1.80518$ | $\nu_6 = 25.43$ |
| $r_{12} = 50.0620$ | | |
| $d_{12} = 4.4200$ | $n_7 = 1.69680$ | $\nu_7 = 55.52$ |
| $r_{13} = -13.3900$ | | |
| $d_{13} = D_2$ (variable) | | |
| $r_{14} = -33.5930$ | | |
| $d_{14} = 3.1500$ | $n_8 = 1.84666$ | $\nu_8 = 23.78$ |
| $r_{15} = -17.8800$ | | |

-continued

| | | | |
|---|---|---|---|
| $d_{15} = 1.0800$ | | | |
| $r_{16} = -17.5160$ | | | |
| $d_{16} = 1.5400$ | | $n_9 = 1.77250$ | $\nu_9 = 49.66$ |
| $r_{17} = -404.4630$ | | | |
| $d_{17} = 2.5500$ | | | |
| $r_{18} = -28.9070$ | | | |
| $d_{18} = 1.8500$ | | $n_{10} = 1.69680$ | $\nu_{10} = 55.52$ |
| $r_{19} = -133.9930$ | | | |
| f | 39.33 | 63.13 | 101.33 |
| $D_1$ | 4.879 | 11.448 | 16.190 |
| $D_2$ | 13.691 | 7.122 | 2.380 |
| aspherical surface coefficient | | | |

$A_4 = 0.50691 \times 10^{-4}$, $A_6 = -0.96184 \times 10^{-8}$
$A_8 = 0.52437 \times 10^{-8}$, $A_{10} = 0$
$|(r_A - r_B)/(r_A + r_B)| = 0.17$, $r_C/f_2 = 1.69$
$\overline{n_{2p}} = 1.67$, $\overline{n_{2n}} = 1.79$, $|f_{C1}/f_T| = 10.7$
$|f_{C2}/f_T| = 7.3$ wherein the reference symbols $r_1, r_2, \ldots$ represent the radii of curvatures on the surface of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Figure 4:
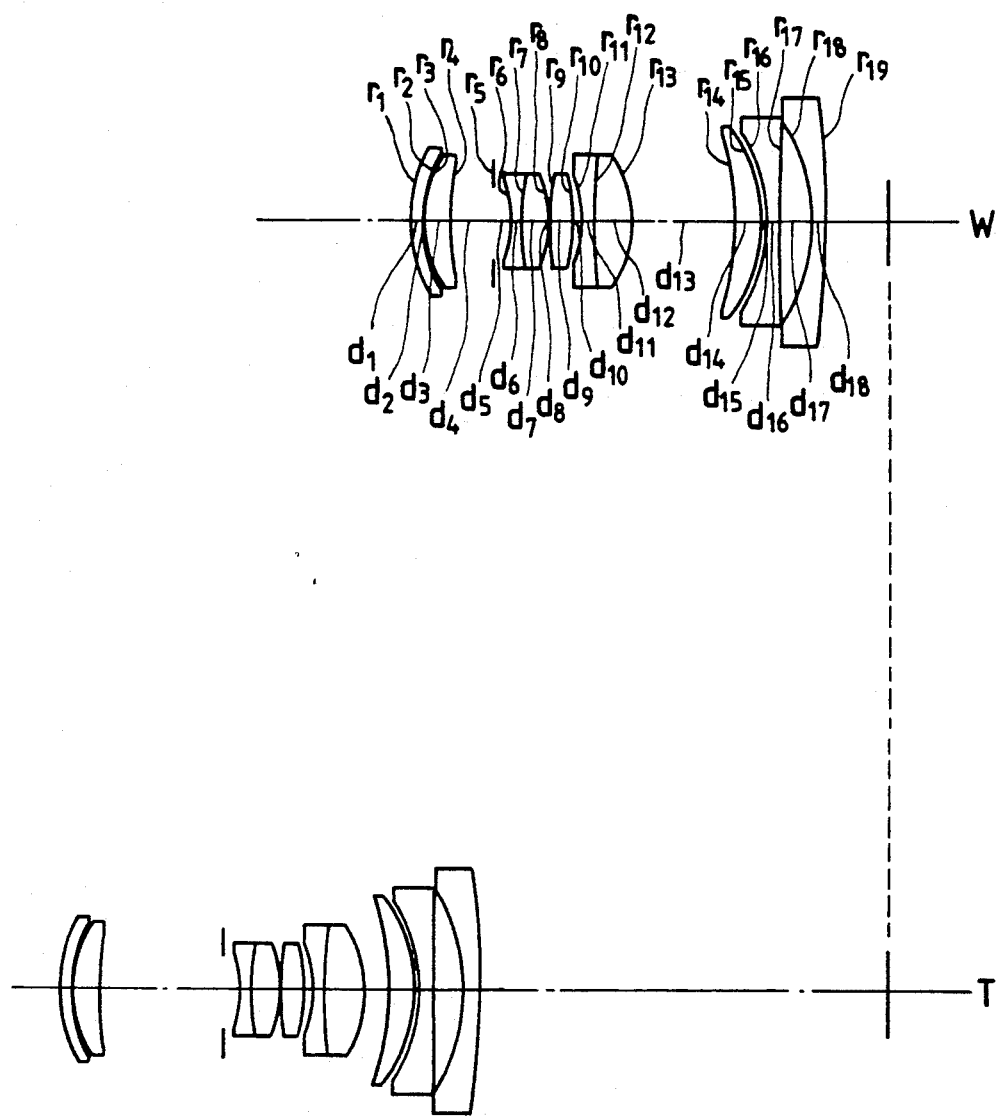
Figure 6:
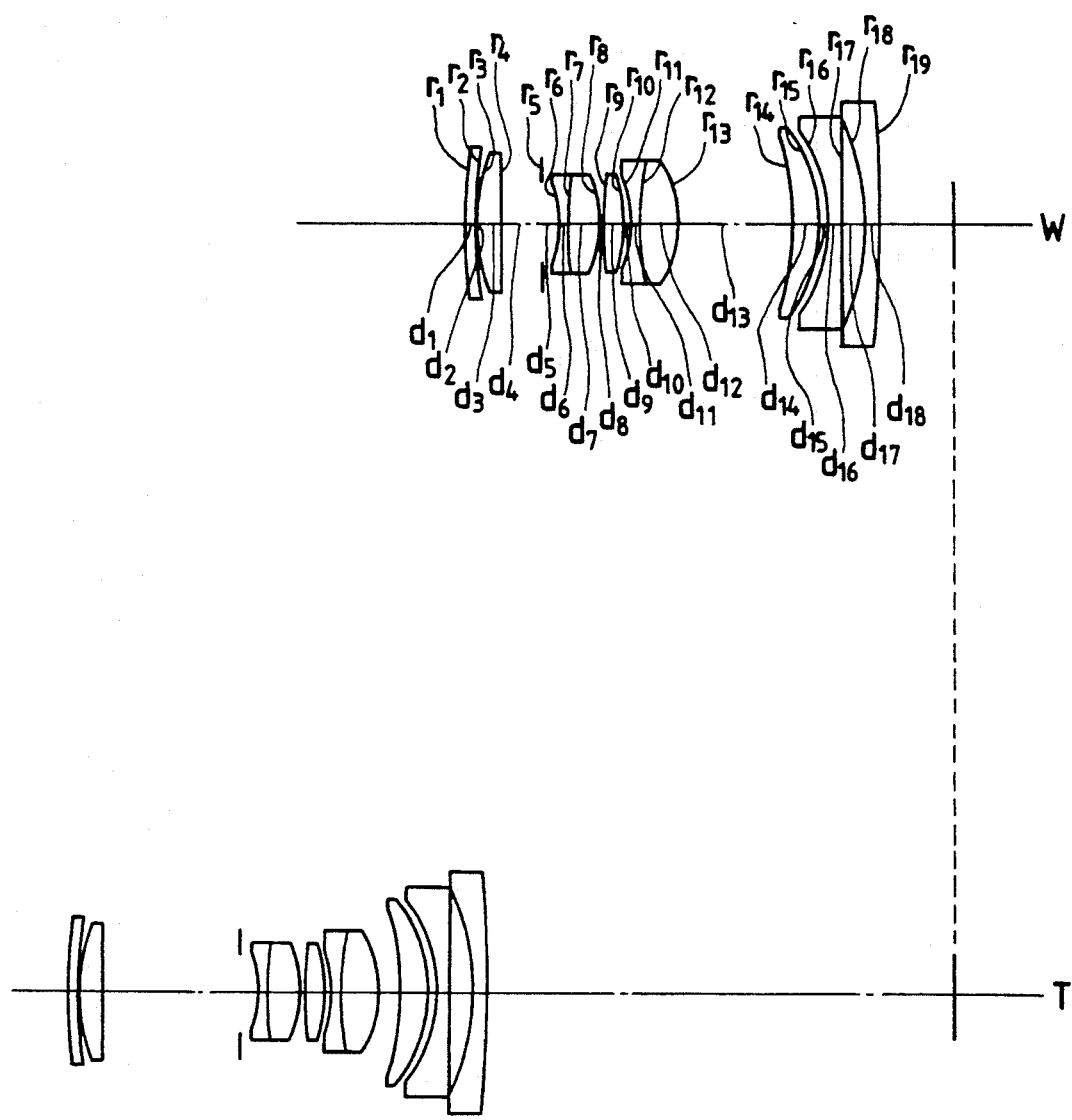
Figure 7:
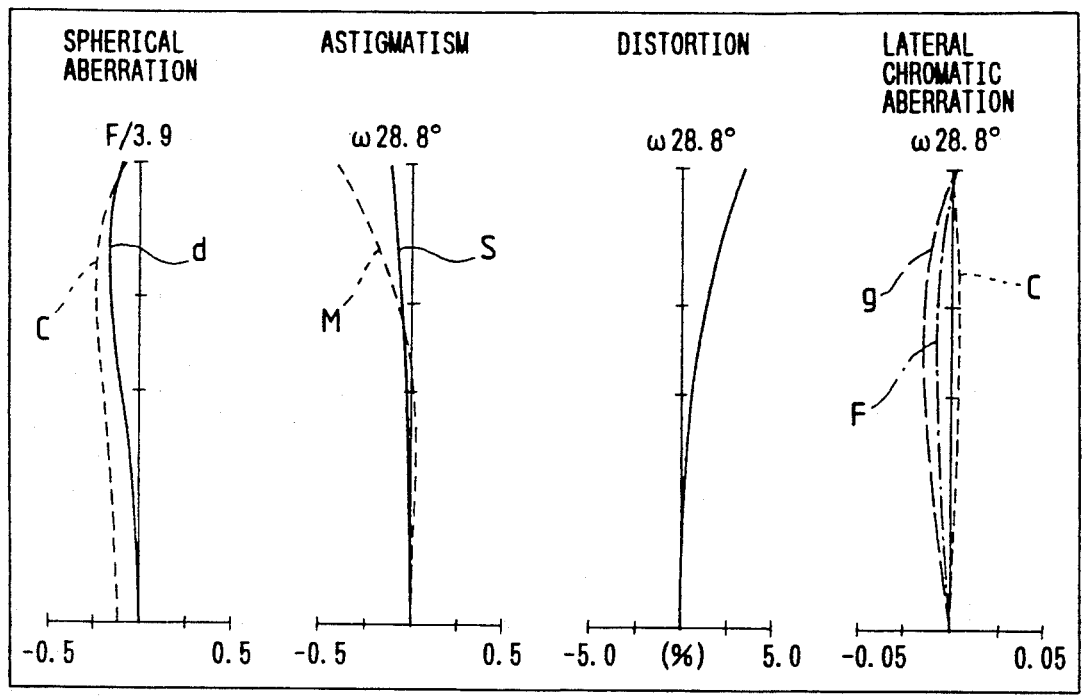
FIG. 7 through FIG. 9 show graphs illustrating aberration characteristics at the wide position, intermediate focal length and tele position respectively of the Embodiment 1 of the present invention.
Figure 8:
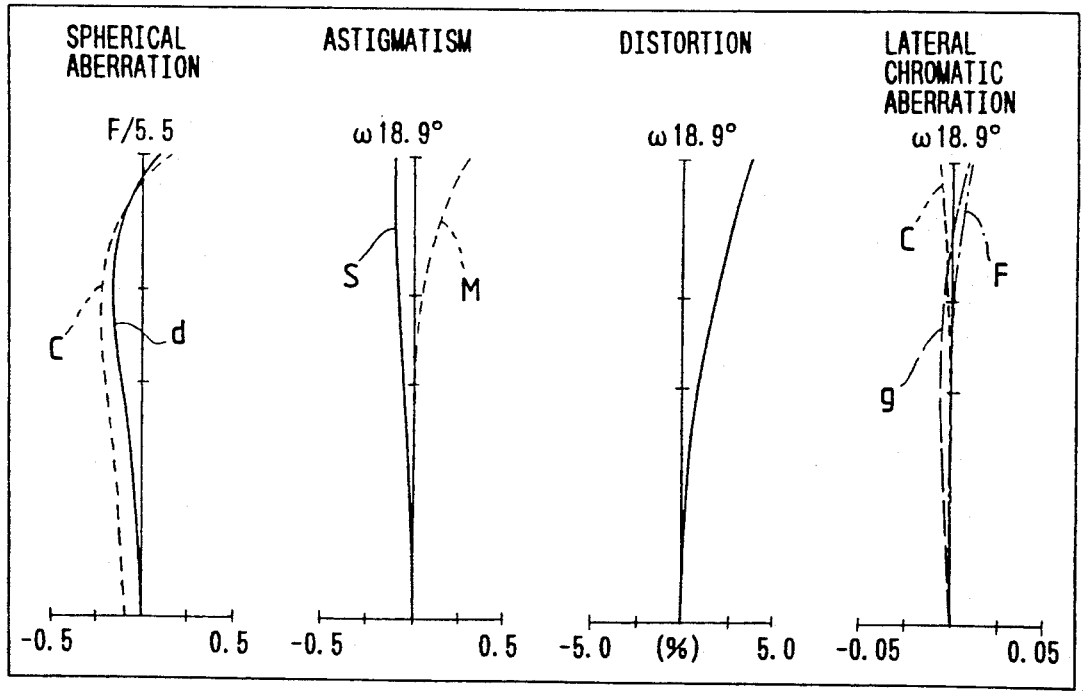
Figure 9:
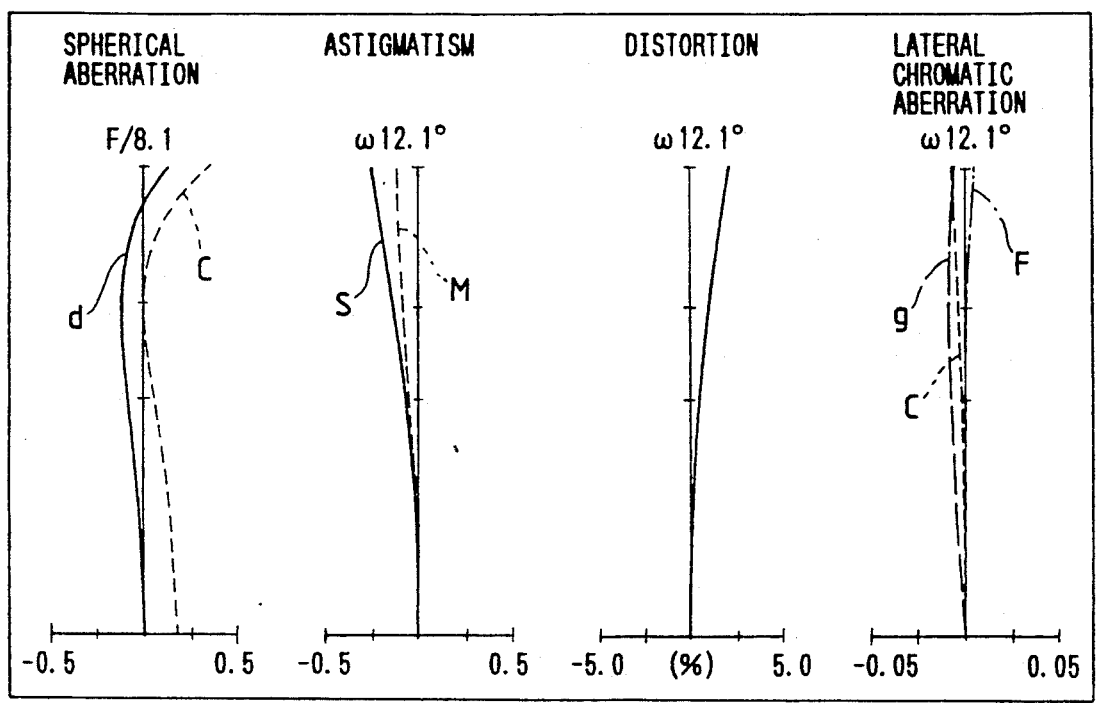
Figure 10:
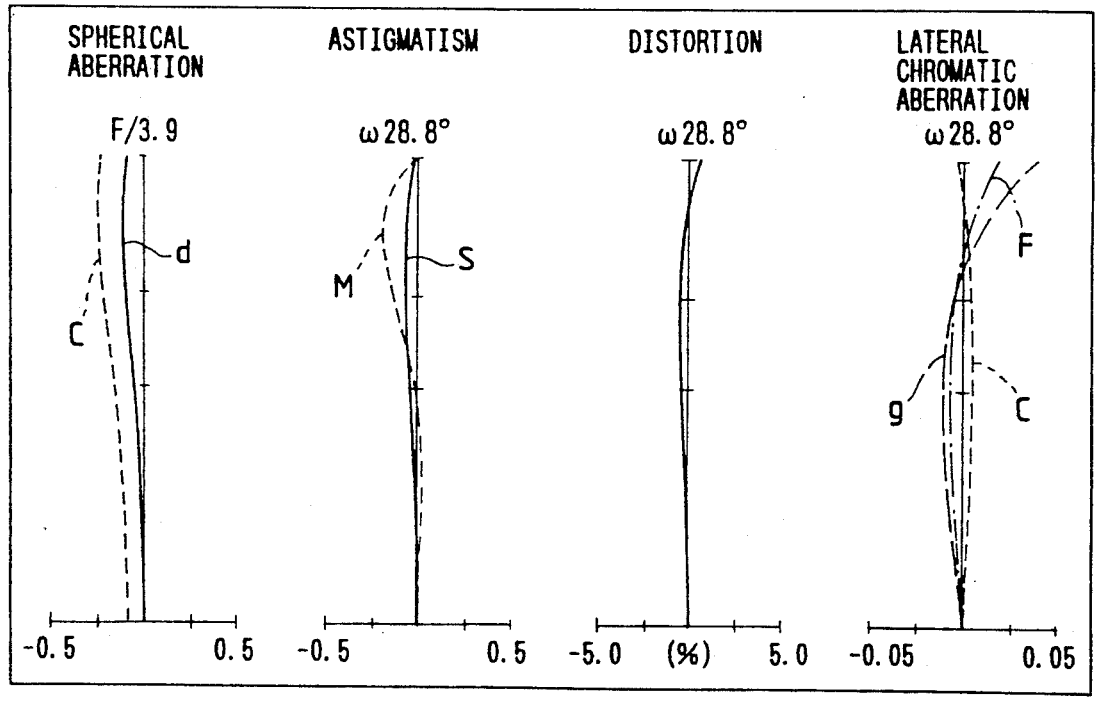
FIG. 10 through FIG. 12 show graphs illustrating aberration characteristics at the wide position, intermediate focal length and tele position respectively of the Embodiment 2 of the present invention.
Figure 11:
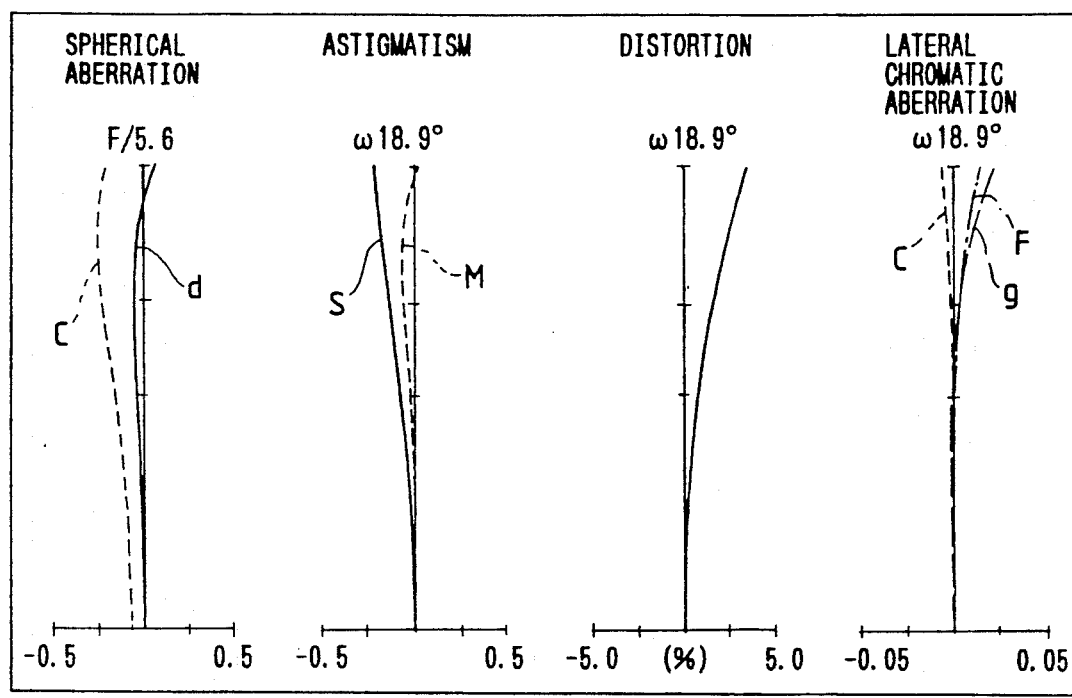
Figure 12:
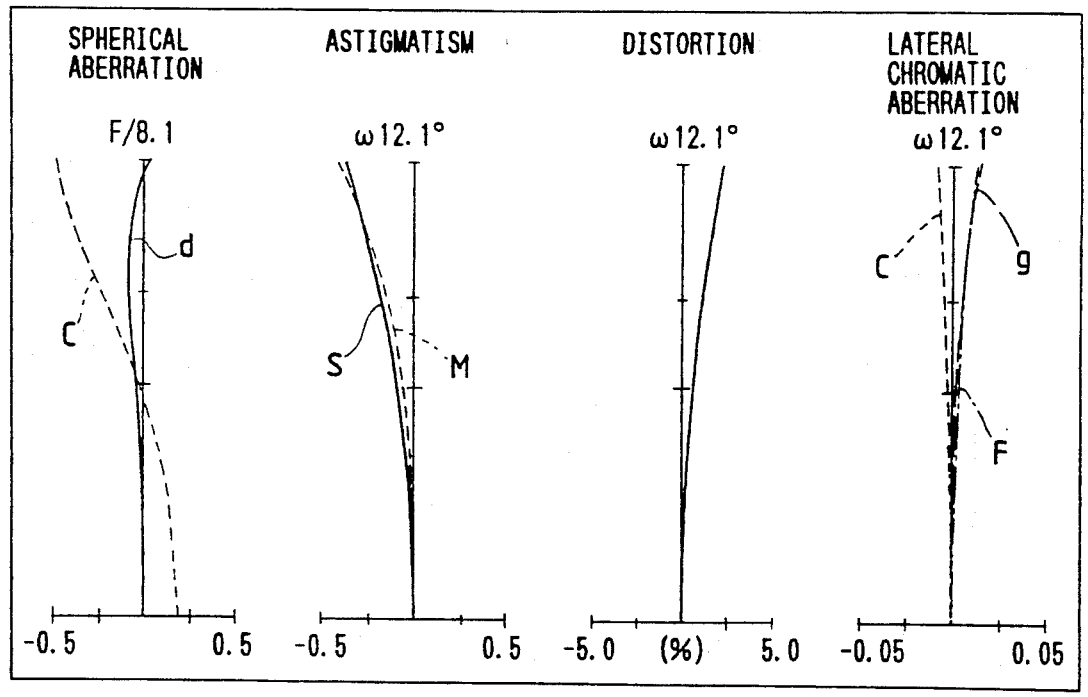
Figure 13:
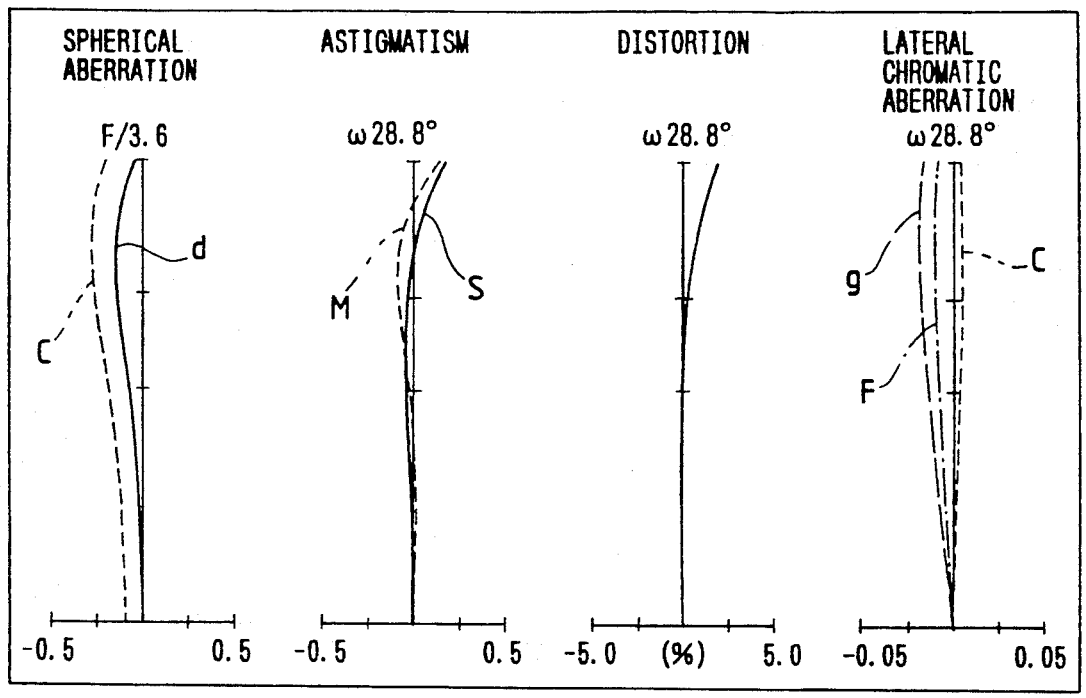
FIG. 13 through FIG. 15 show curves illustrating aberration characteristics at the wide position, intermediate focal length and tele position respectively of the Embodiment 3 of the present invention.
Figure 14:
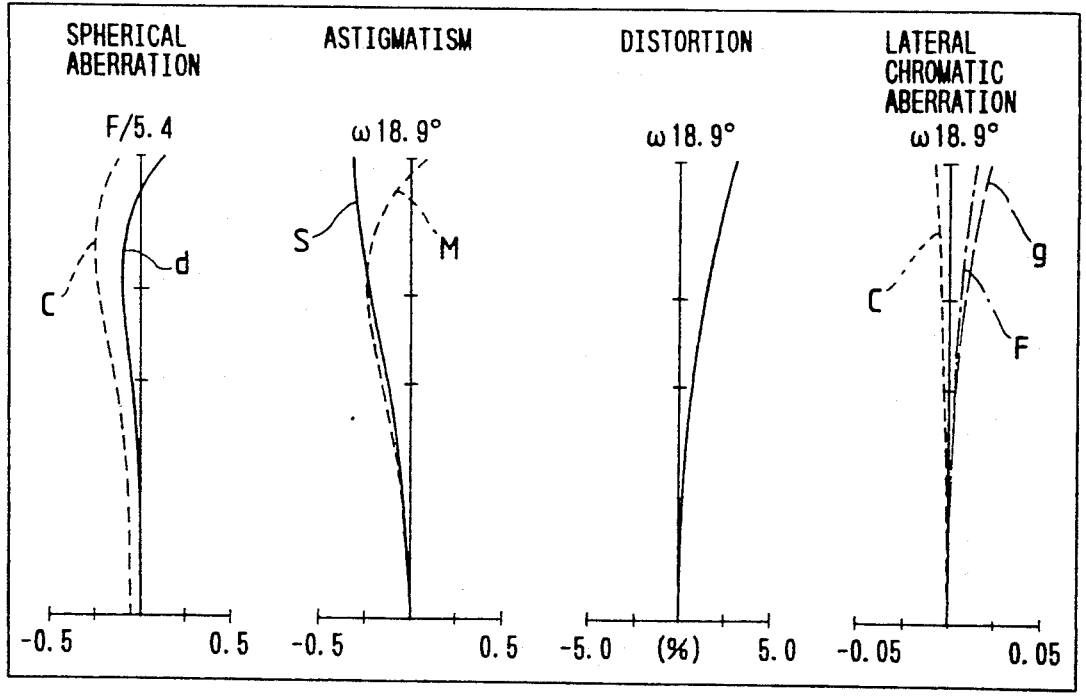
Figure 15:
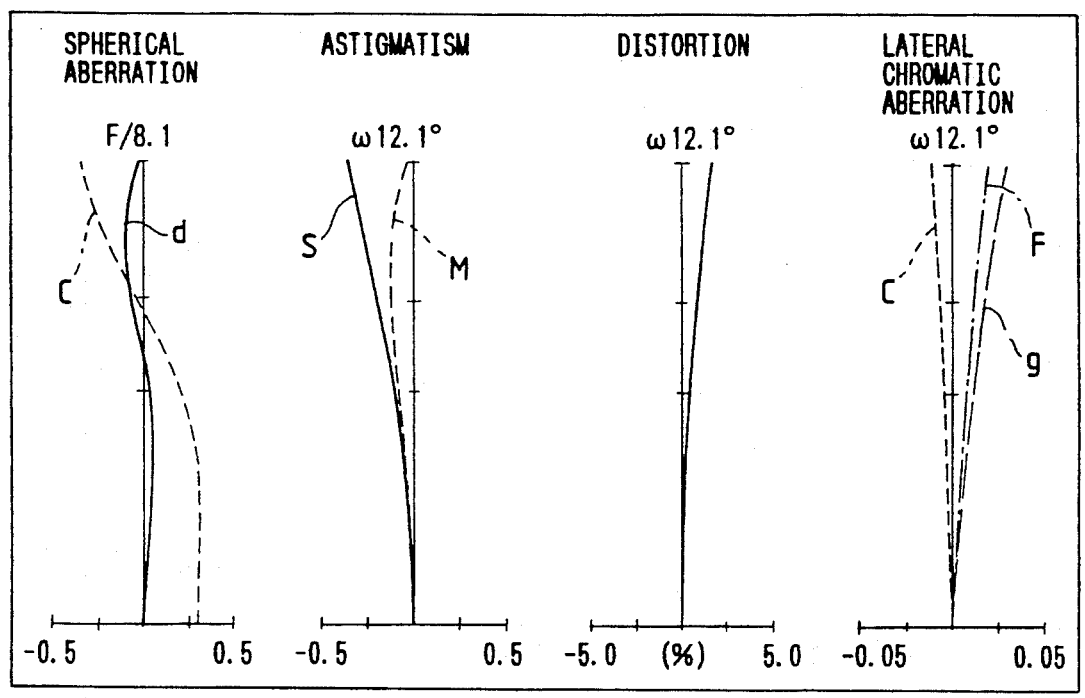
Figure 16:
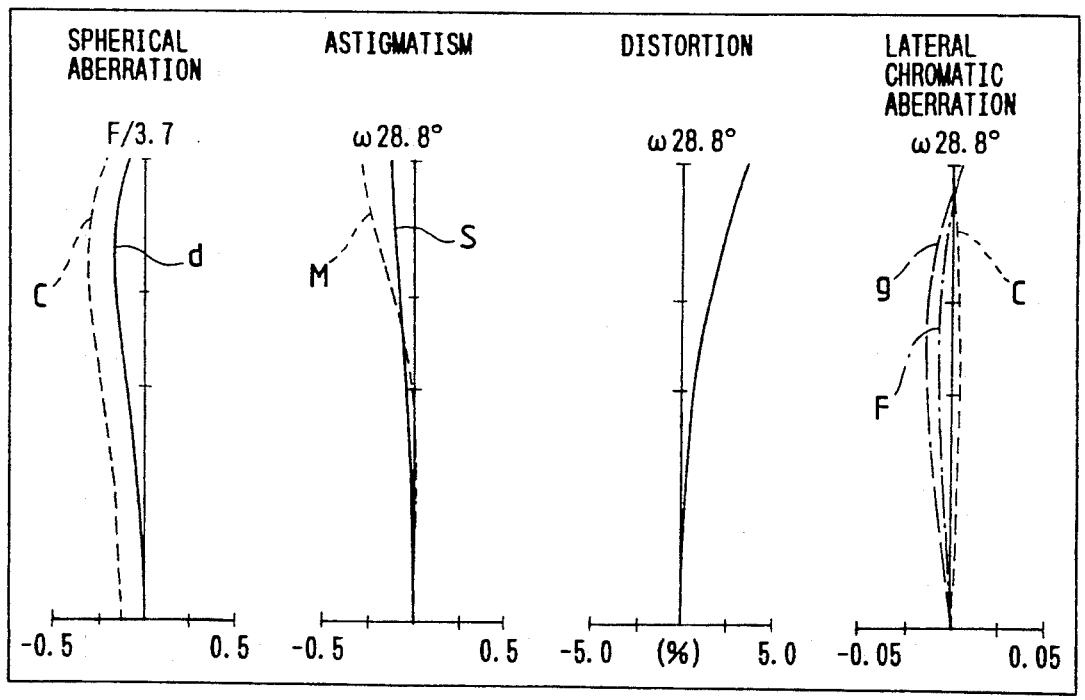
FIG. 16 through FIG. 18 show curves illustrating aberration characteristics at the wide position, intermediate focal length and tele position respectively of the Embodiment 4 of the present invention.
Figure 17:
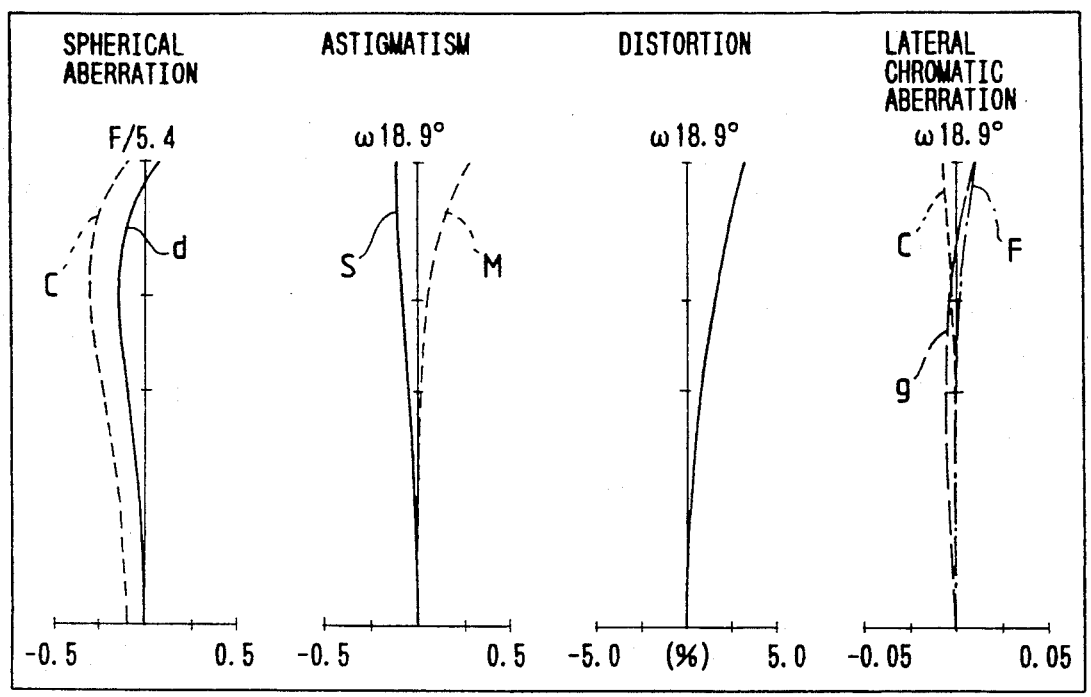
Figure 18:
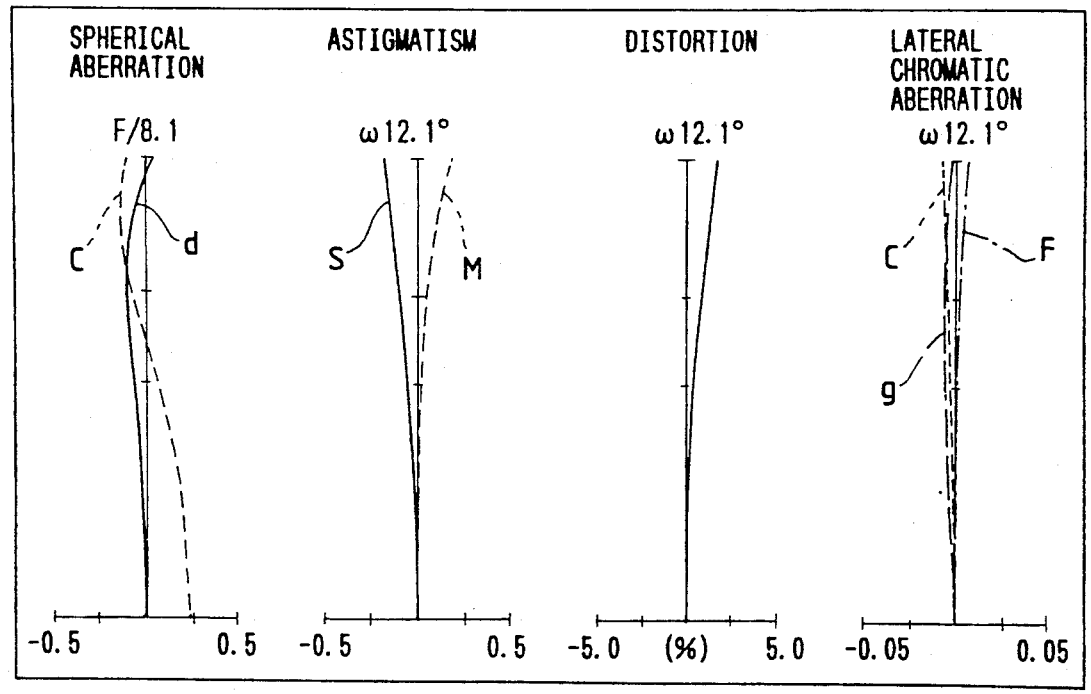
Figure 19:
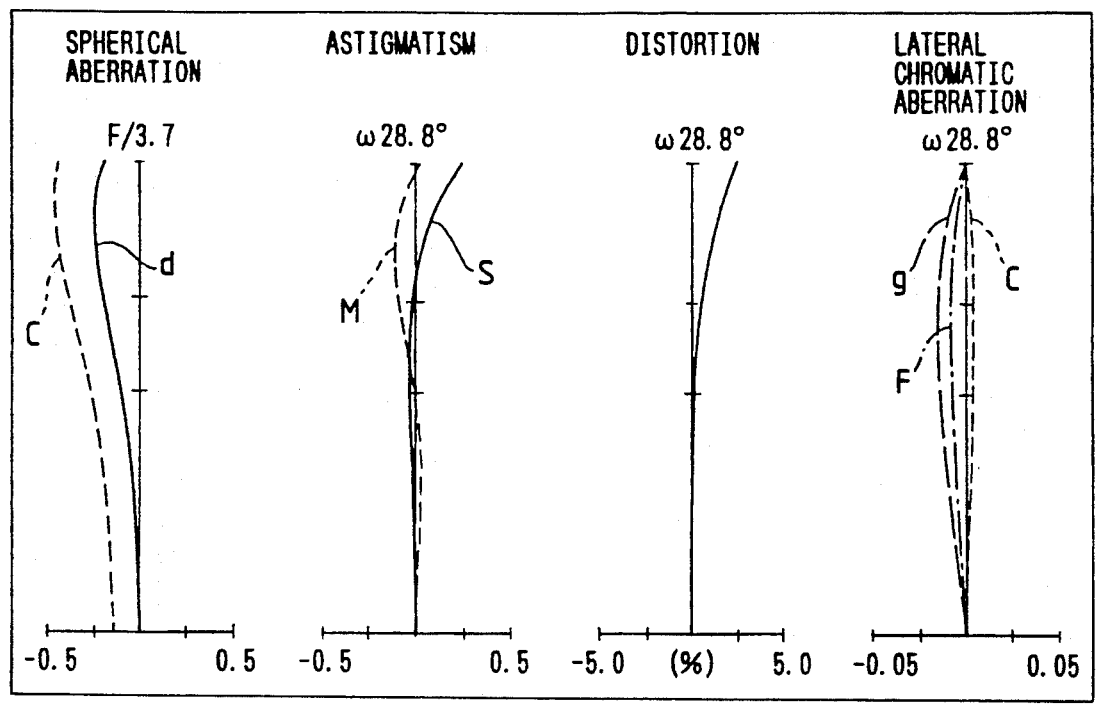
FIG. 19 through FIG. 21 show graphs visualizing aberration characteristics at the wide position, intermediate focal length and tele position respectively of the Embodiment 5 of the present invention.
Figure 20:
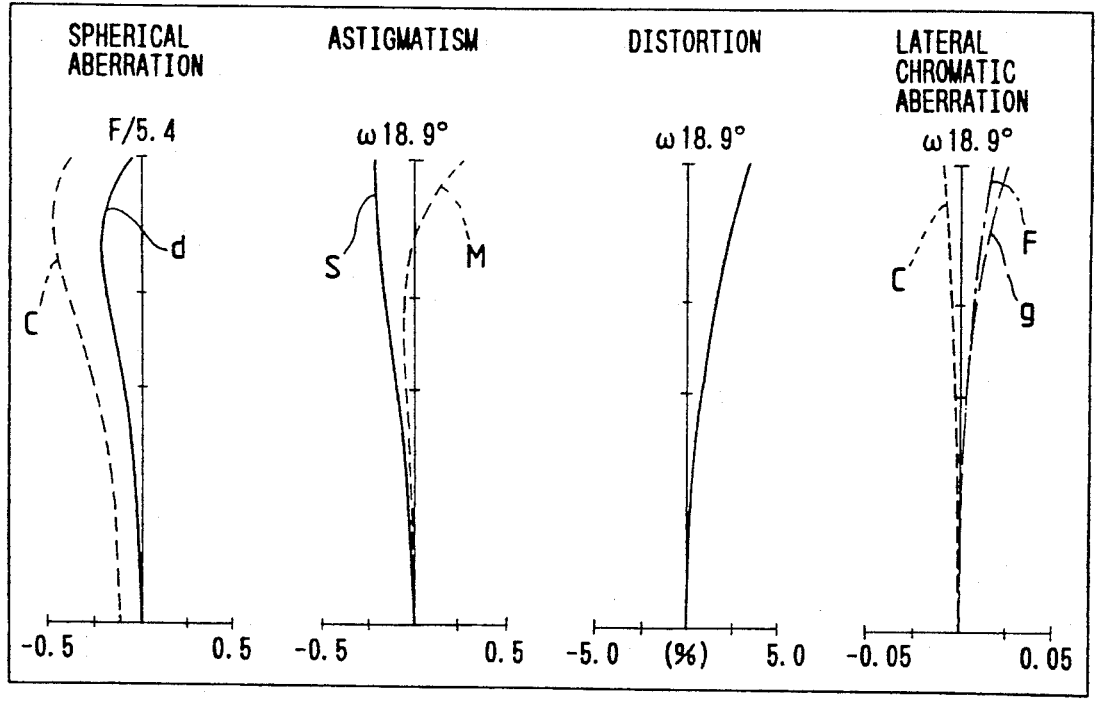
Figure 21:
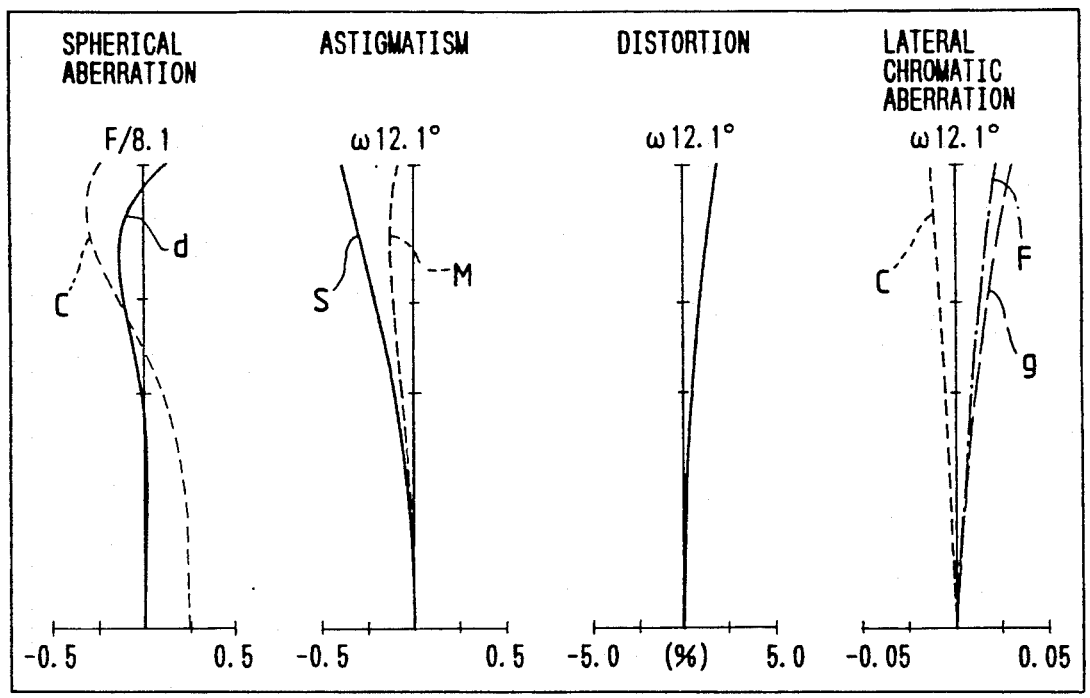
Figure 22:
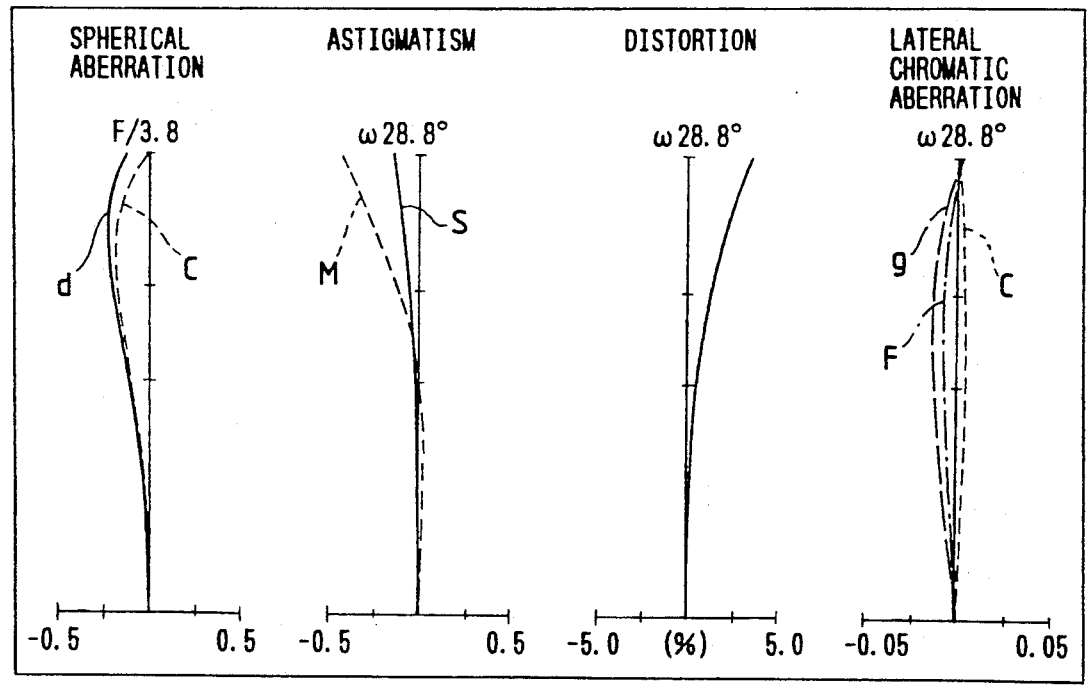
FIG. 22 through FIG. 24 show curves visualizing aberration characteristics at the wide position, intermediate focal length and tele position respectively of the Embodiment 6 of the present invention.
Figure 23:
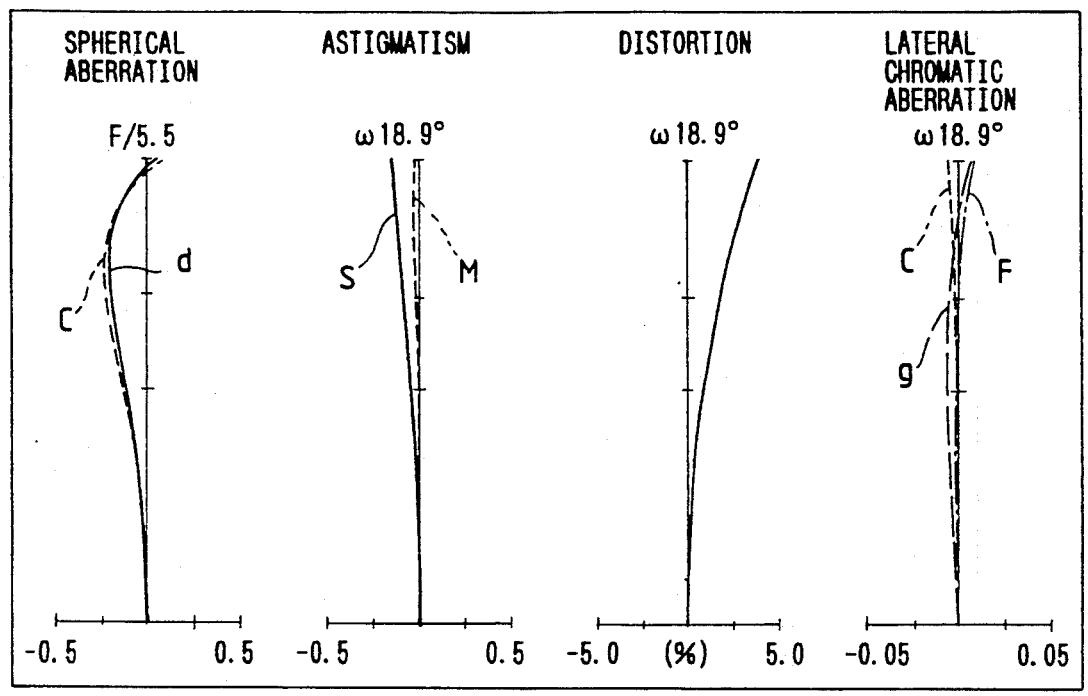
Figure 24:
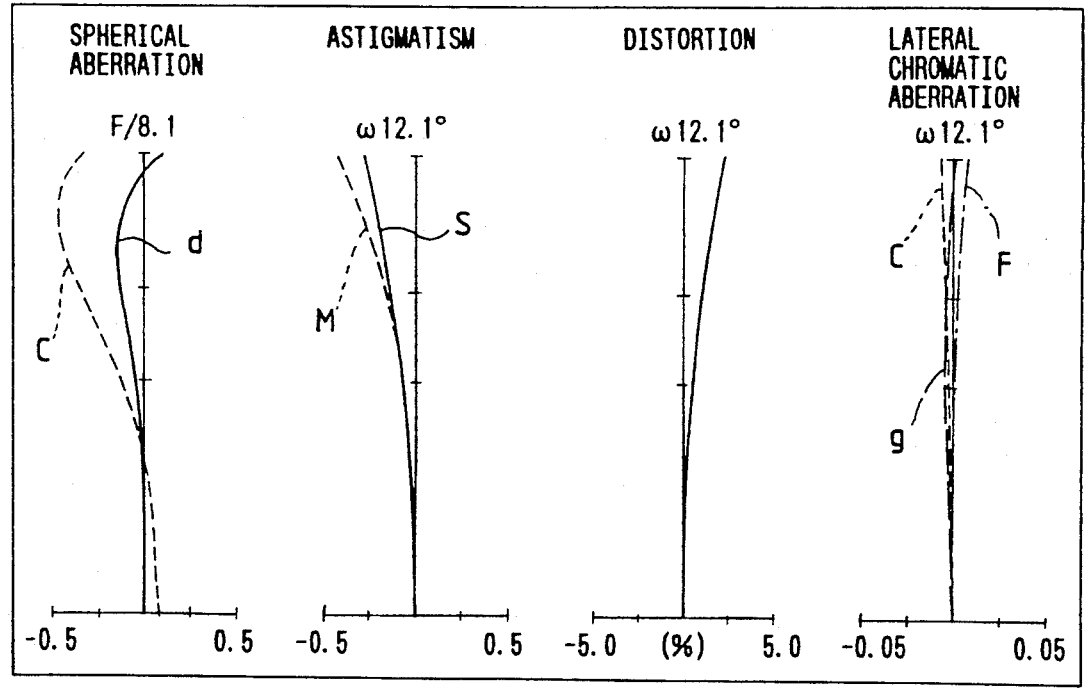

The Embodiments 1, 4 and 6 have the compositions which are similar to one another as illustrated in FIG. 1, FIG. 4 and FIG. 6 respectively. Speaking concretely of the lens units used in each of these embodiments, the first lens unit comprises two lens elements, i.e., a negative lens element and a positive lens element; the second lens unit comprises five lens elements, i.e., a cemented doublet consisting of a negative lens element and a positive lens element, a positive lens element, and a cemented doublet consisting of a negative lens element and a positive lens element; and the third lens unit comprises three lens elements, i.e., a positive lens element, a negative lens element and a negative lens element. The zoom lens system comprises ten lens elements in total.

Figure 2:
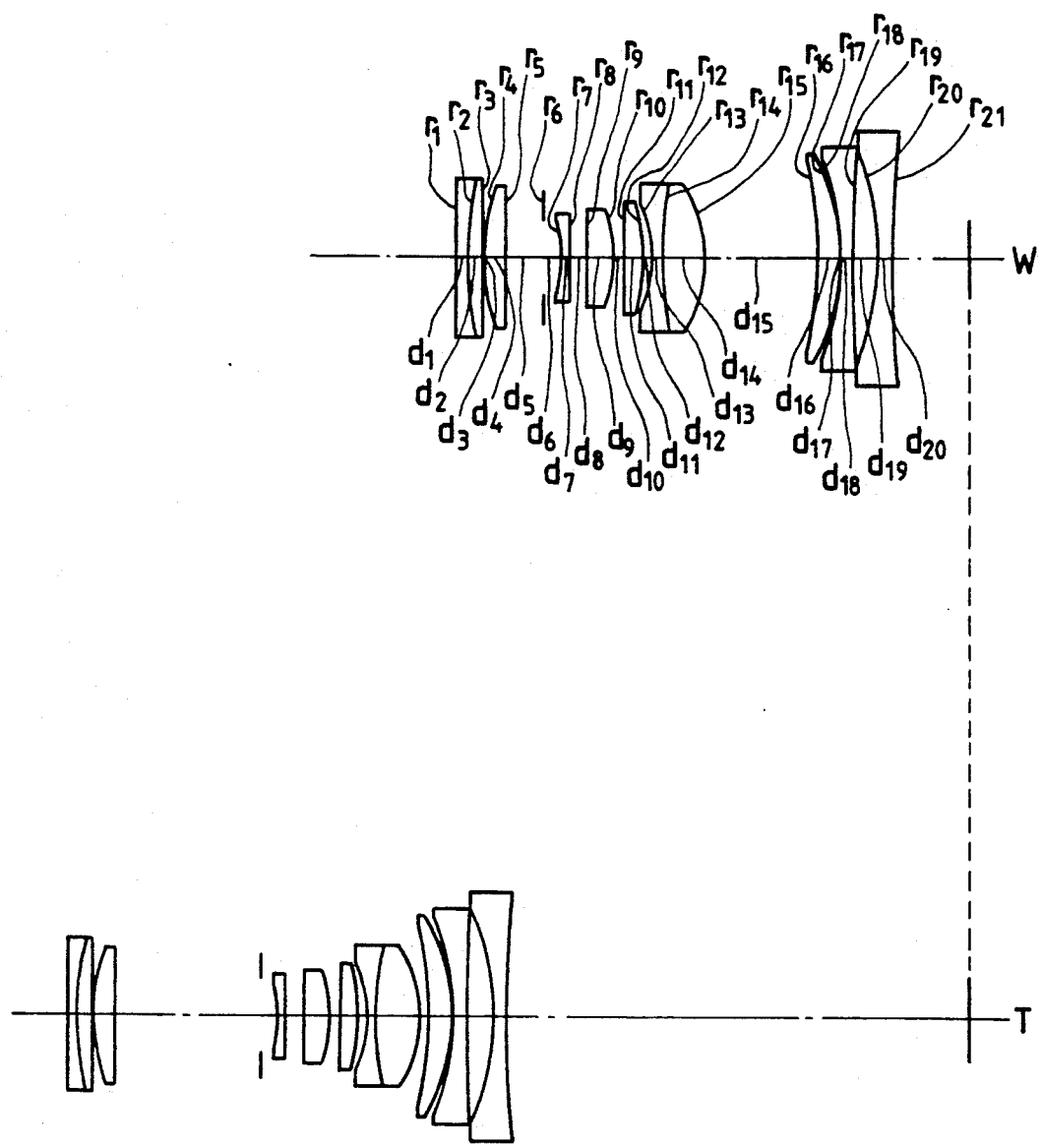

The Embodiment 2 has the composition illustrated in FIG. 2 wherein the first lens unit comprises three lens elements, i.e., a cemented doublet consisting of a negative lens element and a positive lens element, and a positive lens element; the second lens unit comprises five lens elements, i.e., a negative lens element, a positive lens element, a positive lens element, and a cemented doublet consisting of a negative lens element and a positive lens element; and the third lens unit comprises three lens elements, i.e., a positive lens element, a negative lens element and a negative lens element. The Embodiment 2 comprises eleven lens elements in total.

Figure 3:
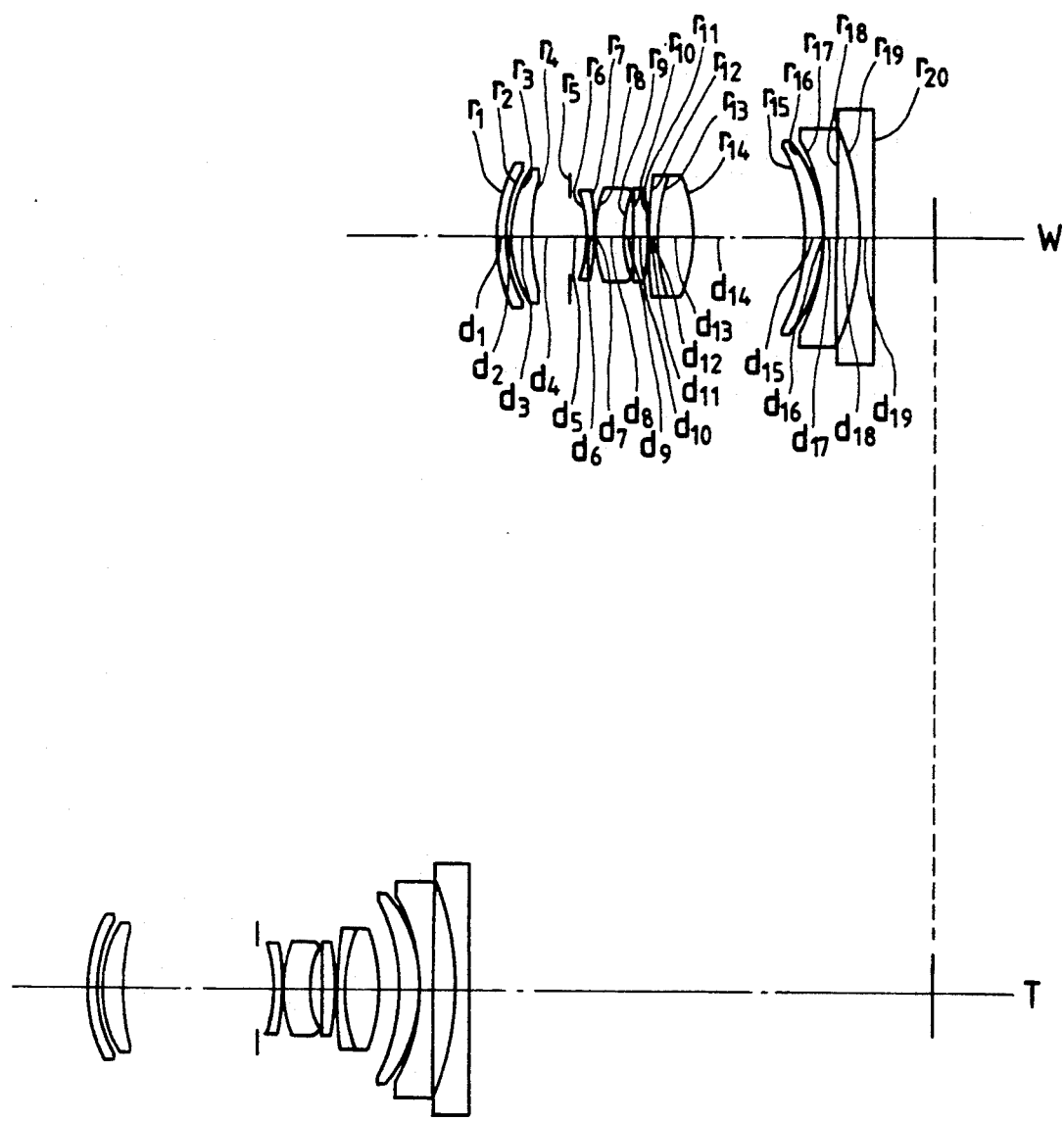
Figure 5:
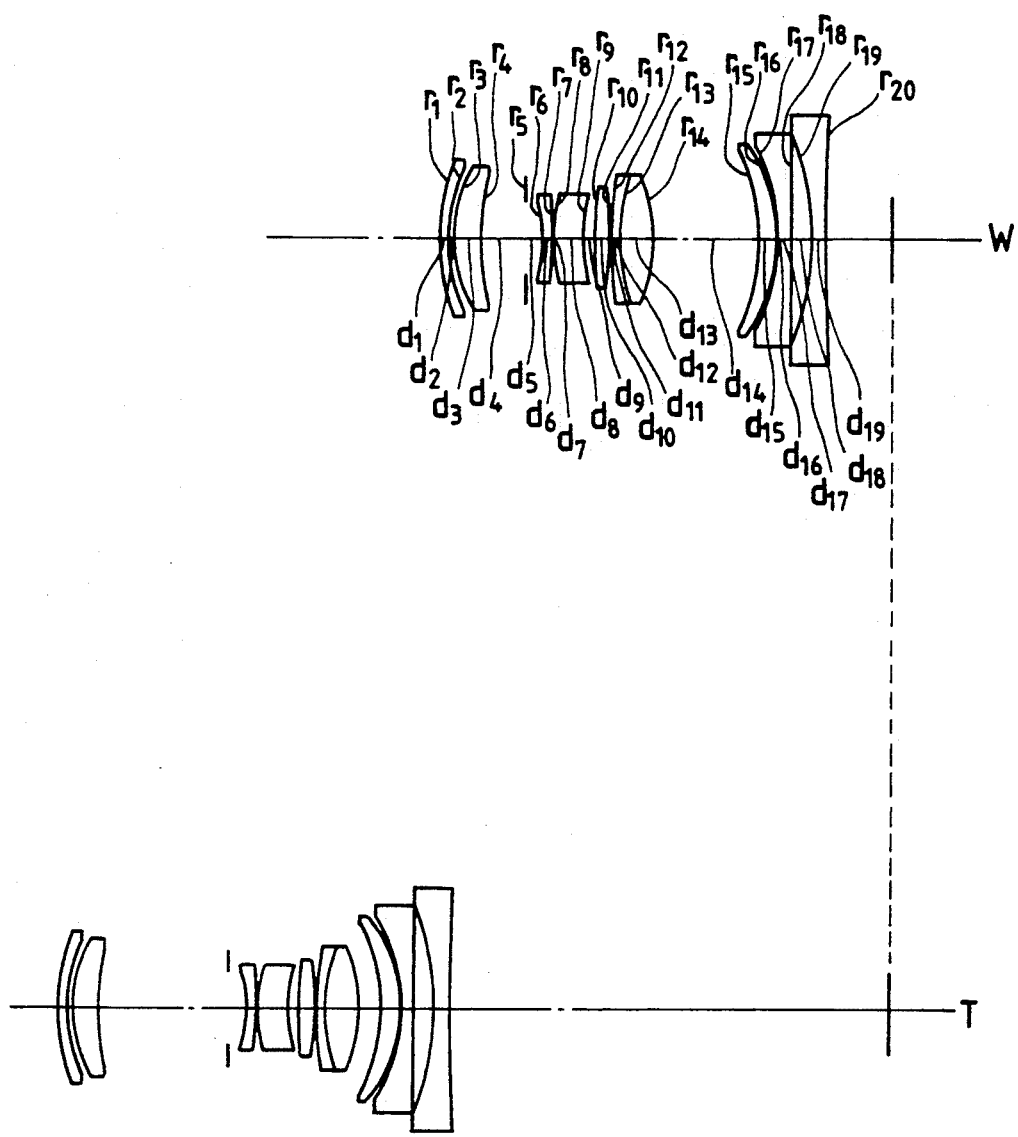

The Embodiments 3 and 5 have the compositions illustrated in FIG. 3 and FIG. 5 respectively. Speaking concretely of the composition of each of the Embodiments 3 and 5, the first lens unit comprises two lens elements, i.e., a negative lens element and a positive lens element; the second lens unit comprises five lens elements, i.e., a negative lens element, a positive lens element, and a cemented doublet consisting of a negative lens element and a positive lens element; and the third lens unit comprises three lens elements, i.e., a positive lens element, a negative lens element and a negative lens element. The zoom lens system preferred as the Embodiment 3 or 5 comprises ten lens elements in total.

All of the embodiments of the present invention is adapted so as to perform variation of focal length by moving the first lens unit and the third lens unit integrally, but each of the three lens units may be moved independently for variation of focal length.

When the direction of the optical axis is taken as the abscissa and the direction perpendicular to the optical axis is taken as the ordinate, the aspherical surfaces used in the embodiments described above have shapes which are expressed by the following formula:

$$x = y^2/(r - \sqrt{r^2 + y^2}) + A_4 y^4 + A_6 y^6 + A_8 y^8 + A_{10} y^{10}$$

wherein the reference symbol represents the paraxial radius of curvature, and the reference symbols $A_4, \ldots, A_{10}$ designates the aspherical surface coefficients.

I claim:

1. A zoom lens system comprising, in order from an object side:

a first lens unit having a positive refractive power;

a second lens unit having a positive refractive power, said second lens unit comprising, in order from said object side, an aperture stop, a first negative lens element, a second positive lens element, a third positive lens element, and a cemented doublet;

a third lens unit having negative refractive power; and an air lens comprising one of a first airspace between said first lens unit and said second lens unit, a second airspace between said third positive lens element and said cemented doublet, and a third airspace between said second lens unit and said third lens unit;

wherein at least one aspherical surface is used as one of the surfaces of said lens elements or said cemented doublet, and said zoom lens system satisfies the conditions (1) through (4) listed below:

(1) $0.1 < |(r_a - r_b)/(r_a + r_b)| < 1.0$
   (2) $0.5 < r_c/f_2 < 5.0$
   (3) $1.55 < \overline{n_{2p}} < 1.75$
   (4) $1.65 < \overline{n_{2n}}$ wherein $r_a$ and $r_b$ are radii of curvature on the object side surface and the image side surface, respectively, of said air lens, $f_2$ is a focal length of said second lens unit, $r_c$ is a radius of curvature on a cemented surface of said second lens unit, $\overline{n_{2p}}$ represents an average value of the refractive indices of the positive lens elements in said second lens unit, and $\overline{n_{2n}}$ designates an average value of the refractive indices of the negative lens elements in said second lens unit, so that a focal length of said zoom lens system is varied by moving each of said lens units toward said object side so that said first airspace is widened and second airspace is narrowed.

2. A zoom lens system comprising, in order from an object side:

a first lens unit having a positive refractive power;

a second lens unit having a positive refractive power, said second lens unit comprising, in order from said object side, an aperture stop, a first negative lens element, a second positive lens elements cemented to said first negative lens element, a third positive lens element, and a cemented doublet;

a third lens unit having negative refractive power; and an air lens comprising one of a first airspace between said first lens unit and said second lens unit, a second airspace between said third positive lens element and said cemented doublet, and a third airspace between said second lens unit and said third lens unit;

wherein at least one aspherical surface is used as one of the surface of said lens elements or said cemented doublet, and said zoom lens system satisfies the conditions (1) through (4) listed below:

(1) $0.1 < |(r_a - r_b)/(r_a + r_b)| < 1.0$
(2) $0.5 < r_c/f_2 < 5.0$
(3) $1.55 < \overline{n_{2p}} < 1.75$
(4) $1.65 < \overline{n_{2n}}$ wherein $r_a$ and $r_b$ are radii of curvature on the object side surface and the image side surface, respectively, of said air lens, $f_2$ is a focal length of said second lens unit, $r_c$ is a radius of curvature on a cemented surface of said second lens unit, $\overline{n_{2p}}$ represents an average value of the refractive indices of the positive lens elements in said second lens unit, and $\overline{n_{2n}}$ designates an average value of the refractive indices of the negative lens elements in said second lens unit, so that a focal length of said zoom lens system is varied by moving each of said lens units toward said object side so that said first airspace is widened and second airspace is narrowed.

3. A zoom lens system according to claim 2 wherein said cemented doublets are designed so as to satisfy the following conditions (5) and (6) respectively:

(5) $|f_{C1}/f_T| > 2$
(6) $|f_{C2}/f_T| > 2$ wherein the reference symbols $f_{C1}$ represents the focal length of the cemented doublet arranged on the object side, the reference symbol $f_{C2}$ designates the focal length of the cemented doublet arranged on the image side and the reference symbol $f_T$ denotes the focal length of the zoom lens system at the tele position thereof.

4. A zoom lens system according to claim 3 wherein the first lens unit comprises a negative lens element and a positive lens element.

5. A zoom lens system according to claim 3 wherein the first lens unit comprises a cemented doublet consisting of a negative lens element and a positive lens element, and a positive lens element.

6. A zoom lens system according to claim 4 or 5 wherein the third lens unit comprises a positive lens element, a negative lens element and a negative lens element.

* * * * *